(12) United States Patent
Venkat et al.

(10) Patent No.: US 6,421,045 B1
(45) Date of Patent: Jul. 16, 2002

(54) SNAP-ON LENS CARRIER ASSEMBLY FOR INTEGRATED CHIP OPTICAL SENSOR

(75) Inventors: Suresh Venkat, Woodinville; Niel W. Campbell, Bellevue; Kevin J. Calmus, Kenmore, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/533,802

(22) Filed: Mar. 24, 2000

(51) Int. Cl.⁷ .................................................. G09G 5/08
(52) U.S. Cl. ...................... 345/167; 345/165; 345/163; 345/166; 345/207; 250/221; 250/221.1
(58) Field of Search ................................. 345/163, 167, 345/166, 165, 164, 207; 250/221, 222.1

(56) References Cited

U.S. PATENT DOCUMENTS 6,218,659 B1 * 4/2001 Bidiville et al. ............ 345/167

* cited by examiner

Primary Examiner—Richard Huerpe
Assistant Examiner—Ali Zamani

(74) Attorney, Agent, or Firm—Banner & Witcoff, Ltd.

(57) ABSTRACT

A snap-on lens carrier for optical pointing devices has retaining legs which structurally affix the lens to the IC to automatically align and register the lens with the aperture plate of the optical sensor. The lens carrier has a body portion which includes the lens and retaining legs arranged on the ends of the body portion. The retaining legs may take various forms, but in general are perpendicular to the body portion with a retaining detent formed at each of their free ends. The retaining legs are configured so that their length between a bearing area on the body portion and the detent corresponds to the thickness of an optical sensor IC. The retaining legs of the lens carrier are resiliently biased to enable the carrier to snap-on to the IC, and thus attached, the IC and lens function as an integral unit when assembled with the remaining components of the pointing device. By attaching the IC and lens in this manner the optical sensor and the lens are in fixed relation to one another and repeatedly precise registration of parts is ensured. In an optical trackball environment, the snap-on lens carrier is employed with a ball cup having an integrally molded transparent tracking window to be aligned with the lens and sensor. The ball cup supports a ball of the trackball device and prevents contamination of the optical components within the device housing.

45 Claims, 11 Drawing Sheets

SNAP-ON LENS CARRIER ASSEMBLY FOR INTEGRATED CHIP OPTICAL SENSOR

TECHNICAL FIELD

This invention relates generally to a tracking lens carrier for an optical sensor carried on an integrated chip (IC) and an assembly integrating the lens carrier into an optical trackball device. More particularly, the invention provides a tracking lens carrier which snaps onto the IC such that the aperture plate of the IC bears against the carrier and the lens registers and aligns with the optical sensor. In a trackball environment the lens carrier is also aligned with the tracking aperture of a ball cup.

BACKGROUND OF THE INVENTION

Integrated chips with optical sensors are typically used for solid state computer input devices which rely on optical tracking to calculate relative displacement values to be communicated to an output converter. These input devices include optical pointing devices such as computer mice and trackballs. An IC with a reflective optical sensor is commercially available from Hewlett-Packard under the designation HDNS-2000, and is typically mounted on a printed circuit board (PCB). which is assembled with a lens plate. The assembly is mounted on a base plate of a housing for the computer input device. The base plate has an aperture operatively registered with and aligned with the magnified light from an LED for the optical sensor. Conventional assemblies of these components have relied on simple registration tabs and mating in the base plate, lens plate and IC mounted PCB to ensure that the aperture plate of the optical sensor, lens and aperture are operatively aligned.

With multiple components which must be assembled and registered together, any misalignment or registration error in such a conventional assembly is compounded and results in an unreliable or even inoperable pointing device. This can be a particular problem during manufacture since these components of pointing devices are most often assembled by hand.

Due to the multiplicity of parts which must be registered and assembled together these conventional assemblies are inefficient to manufacture and suffer from reliability flaws. With currently employed parts and techniques, there is no reliable way of ensuring repeatable and precise registration of the lens and base plate aperture with the aperture plate of the IC optical sensor.

In both optical mouse and trackball type devices, the lens must be aligned with a tracking aperture through which light is supplied to enable the optical sensor to "read" a pattern on a tracking surface. The tracking surface is a flat surface for an optical mouse or a ball for an optical trackball. In conventional optical input devices, the tracking aperture is a through-hole which provides an avenue for contaminants such as dust or other particles to enter the device housing.

In optical trackball devices the ball itself presents the tracking surface that is "read" by the optical sensor. For typical optical trackballs, the ball is placed in a socket on the top of the housing or along a side of the housing for manipulation by a user's finger or thumb. A drawback of the conventional optical trackball devices is that the optics or the lens and the electronics including the sensor are extremely sensitive to dust, dirt, liquid spills and other contaminants. With the ball socket located at the top or on the side of the housing makes the device components more susceptible to contaminants since contaminants can fall down easily into the socket and accumulate on the sensor.

SUMMARY OF THE INVENTION

The present invention overcomes the problems of the prior art by providing a lens carrier with retaining legs which structurally affix the lens to the IC in such a manner as to automatically align and register the lens with the aperture plate of the optical sensor. The retaining legs of the lens carrier are resilient to enable the carrier to snap-on to the IC, and thus attached, the IC and lens function as an integral unit when assembled with the remaining components of the pointing device. By attaching the IC and lens in this manner the optical sensor and the lens are in fixed relation to one another and repeatedly precise registration of parts is ensured.

The snap-on lens carrier has a body portion which includes the lens and retaining legs arranged on the ends of the body portion. The retaining legs may take various forms, but in general are perpendicular to the body portion with a retaining detent formed at each of their free ends. The retaining legs are configured so that their length between a bearing area on the body portion and the detent corresponds to the thickness of an optical sensor IC. When the snap-on lens carrier is assembled to the IC, in a cradle-like manner, the body portion of the carrier bears against a flat side of the IC so that the IC aperture plate is aligned and registered with the lens with each retaining leg extending along an end of the IC and affixed thereto by the detents bearing against the opposite side of the IC.

In order to take maximum advantage of the inventive lens carrier in a pointing device assembly, the PCB is configured to receive the optical sensor IC and includes sufficient openings for the retaining legs of the lens carrier to protrude through the PCB and attach to the IC. Once the IC is mounted to one side of the PCB, the lens carrier is positioned from the opposite side of the PCB with its retaining legs extending through assembly openings to snap onto the IC and provide automatic alignment and registration of the lens with the optical sensor. By affixing the IC to the lens carrier in this manner, several registration and alignment issues during the assembly process are nullified, and precision and repeatability are enhanced.

The snap-on lens carrier is adapted to be used in both optical mouse and optical trackball environments. Another aspect of the assembly for trackball devices is the provision of a ball cup to line the socket. The ball cup completely supports the ball and surrounds the portion of the ball received therein. The cup includes a tracking aperture having an integral window pane to keep out contaminants and provide higher electrostatic discharge protection to the components. The cup also includes alignment guides for attaching a PCB having an optical sensor IC and snap-on lens carrier mounted thereon. The snap-on lens carrier ensures that the optical components are automatically aligned with the tracking window of the ball cup.

DETAILED DESCRIPTION OF THE INVENTION

Figure 1:
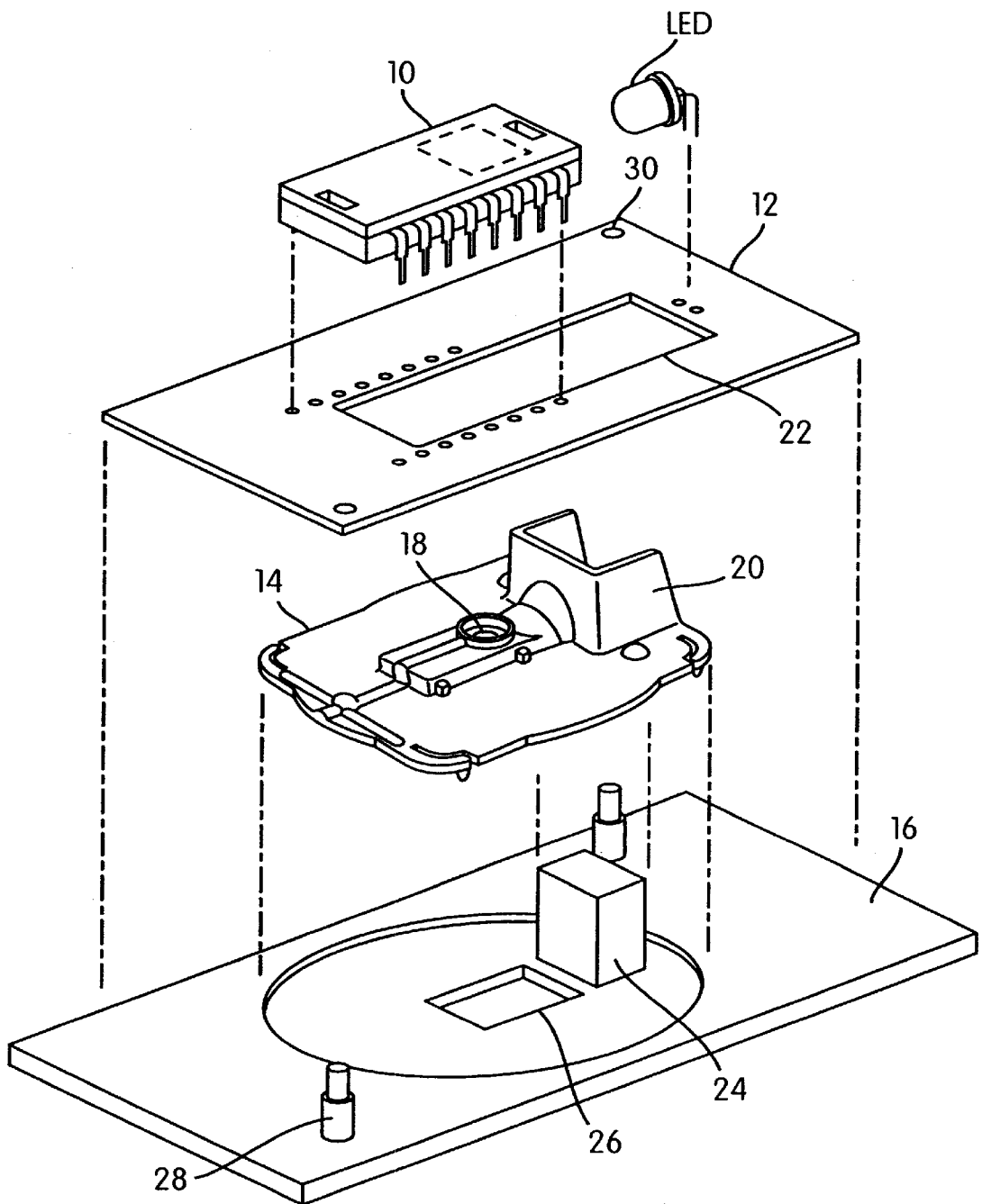
FIG. 1 is an exploded view of the components of a conventional optical sensor IC and aperture plate assembly for an optical mouse environment.

A conventional tracking lens and optical sensor assembly in an optical mouse environment is illustrated in FIG. 1 in which a light source such as an LED is operatively assembled with an optical sensor IC 10 and PCB 12 shown aligned with a lens plate 14 and base plate 16. The LED is typically coupled to the IC by a clip or other means. The aperture plate of IC 10 is oriented downward in FIG. 1 so that the optical sensor will be registered with lens 18 of lens plate 14 once the IC is mounted to the PCB. The. registration mechanism between lens 18 and the optical sensor comprises a rectangular walled opening 20 with at least opposing walls received in assembly opening 22 of the PCB. Registration of lens plate 14 to base plate 16 is achieved by projecting registration column 24 through walled opening 20. The simple registration guides such as walled opening 20, assembly opening 22 of the PCB and column 24 of the base plate are arranged so that the optical sensor aligns with lens 18 and tracking aperture 26 of base plate 16. The PCB is registered with base plate 16 by alignment posts 28 on the base plate being received in alignment apertures 30 of the PCB. None of the critical components are affixed relative to another, and the dimensional tolerances necessitated by conventional assembly using these registration guides results in some "play" between the components. These simple geometric registration constraints prevent precise and repeatable alignment of the critical components such as the sensor, lens and tracking aperture.

Figure 2:
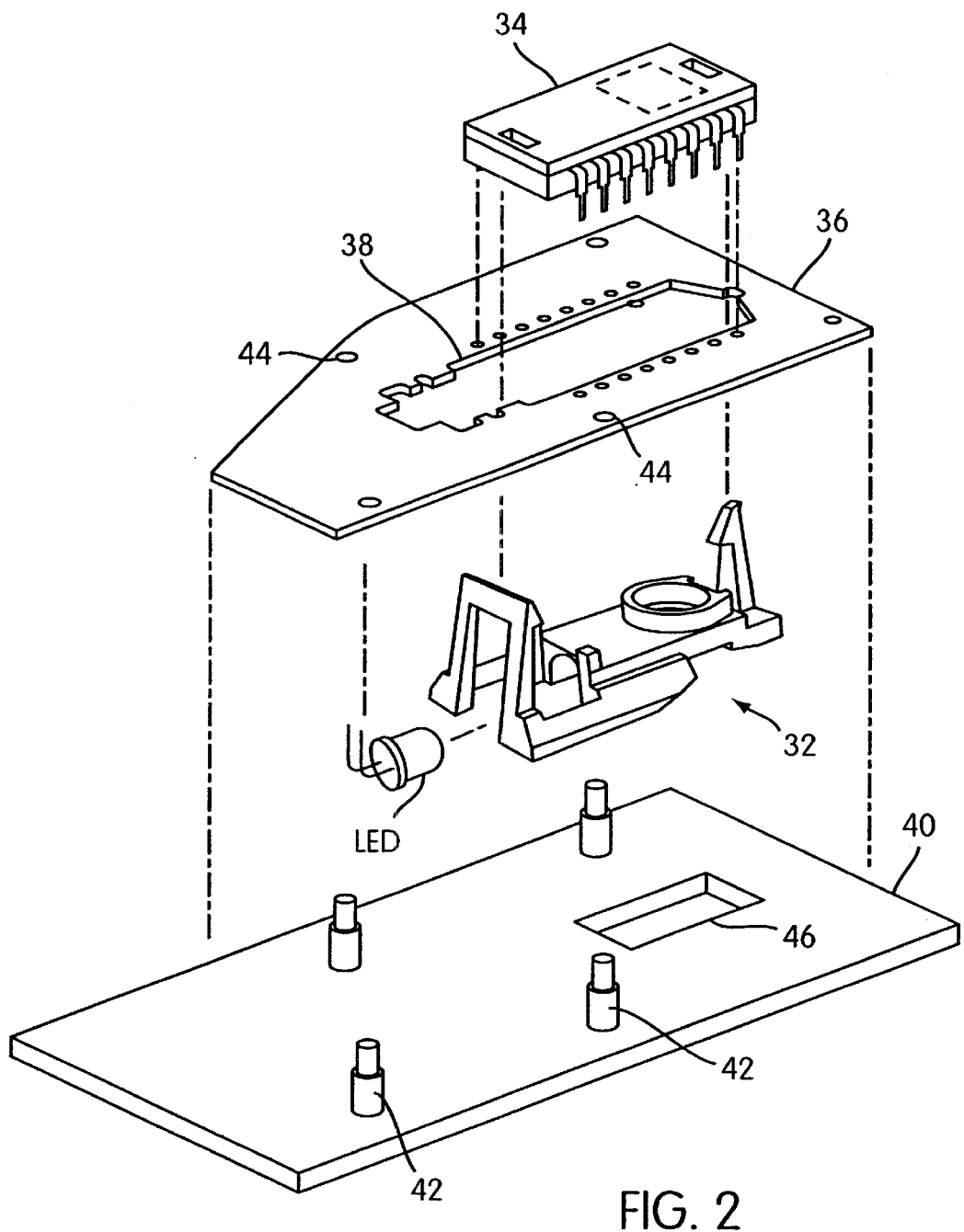
FIG. 2 is an exploded view of the snap-on lens carrier in accordance with the present invention, shown with exemplary components of the optical sensor IC assembly in an optical mouse environment.

The snap-on lens carrier of the present invention eliminates the geometric registration guides of the prior art and all of the problems associated with dimensional tolerances between the sensor and the lens. FIG. 2 illustrates the lens carrier employed in an optical mouse environment. FIG. 2 is an exploded assembly view of a lens carrier 32 shown aligned with IC 34 as they would be assembled on a PCB 36 through assembly opening 38. Also illustrated is a base plate 40 with alignment posts 42 arranged to be received in alignment apertures 44 of the PCB. Base plate 40 has a tracking aperture 46.

Figure 2A:
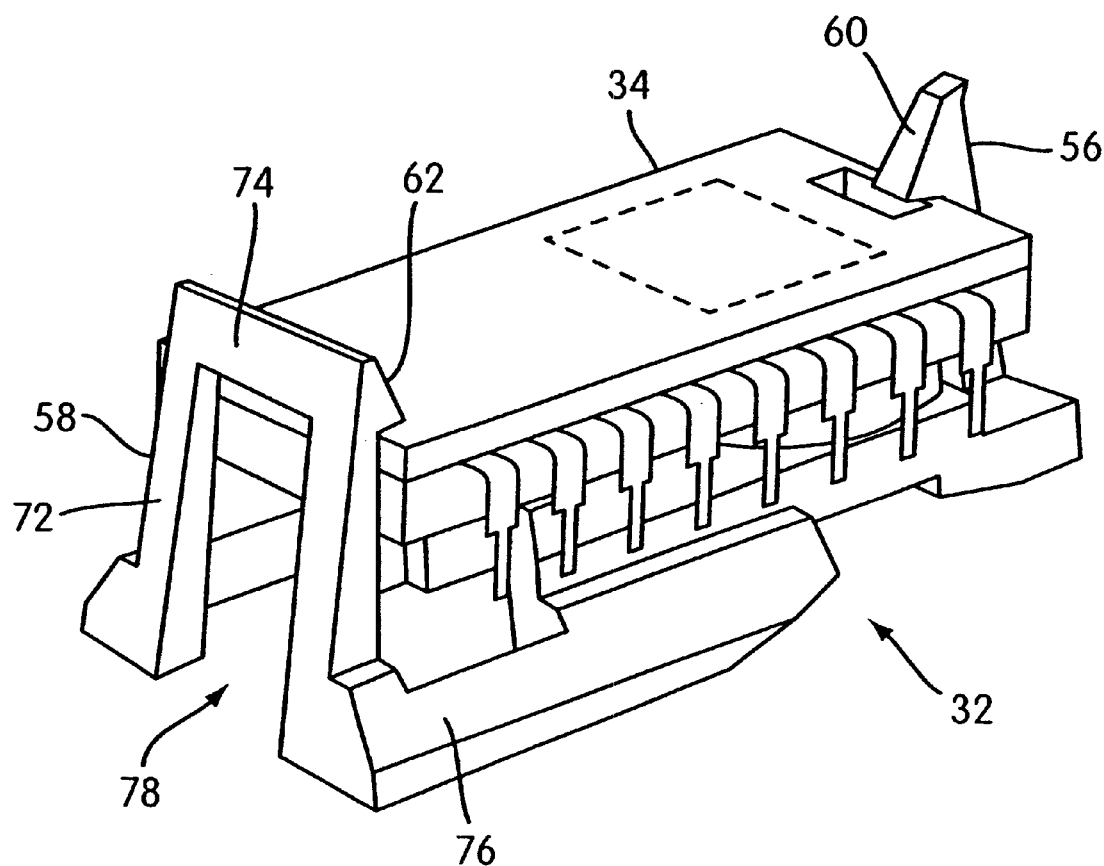
FIG. 2A is a perspective view of the snap-on lens carrier affixed to an optical sensor IC.

Reference is made to FIG. 2A for a detailed perspective view of lens carrier 32 assembled to IC 34, again in an optical mouse environment, and to FIGS. 3–11 for detailed views of lens carrier 32. For the sake of convenient explanation, when directional descriptions are used this in specification, they are made with reference to the orientation of the components as shown in FIG. 2 which is for a typical optical mouse. However, the actual orientation of the components may vary depending on the type of pointing device, or in various stages of assembly and manufacture.

Lens carrier 32 has a carrier body portion 48 including a lens 50 formed within in a well 52 with an annular bearing surface 54. Bearing surface 54 may be a variety of shapes, and is generally parallel to the main plane of body 48. At opposing ends of body 48 are generally perpendicularly extending retaining legs 56 and 58 having sloped cam surfaces 60 and 62 at their free ends forming retaining detents 64 and 66. Retaining legs 56 and 58 generally appear to be perpendicular to body 48, but are actually angled slightly less than 90° from body 48. Carrier 32 is preferably molded from a material such as thermoset resin so that legs 56 and 58 can flex slightly outward relative to one another and snap back into their resting positions. Alternative materials which can be made to resiliently bias retaining legs inward toward each other may be employed for carrier 32.

Figure 4:
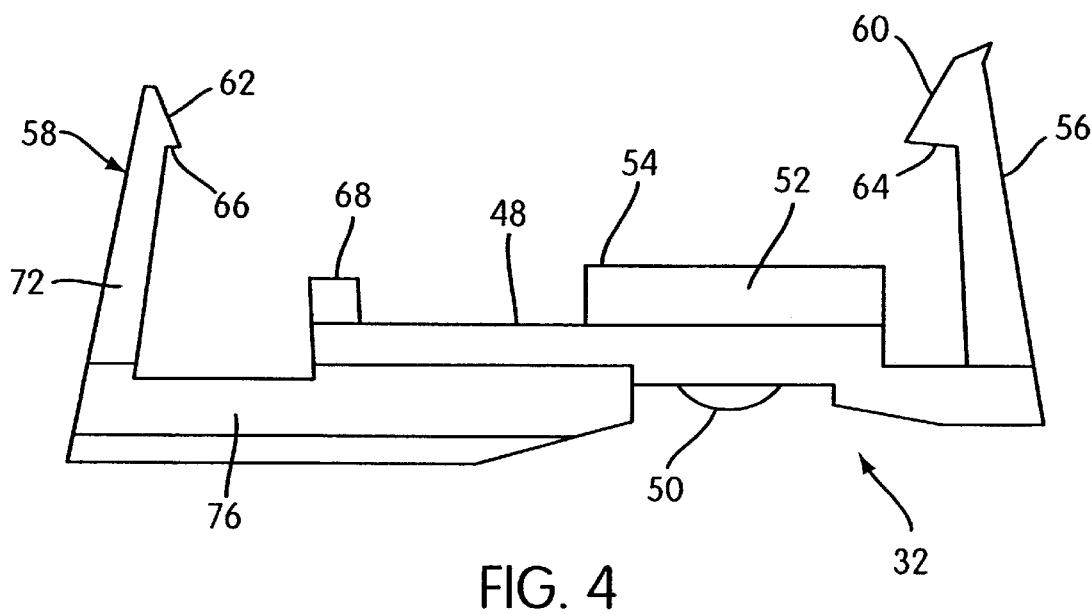
FIG. 4 is a side elevational view of the snap-on lens carrier of FIG. 3.
Figure 5:
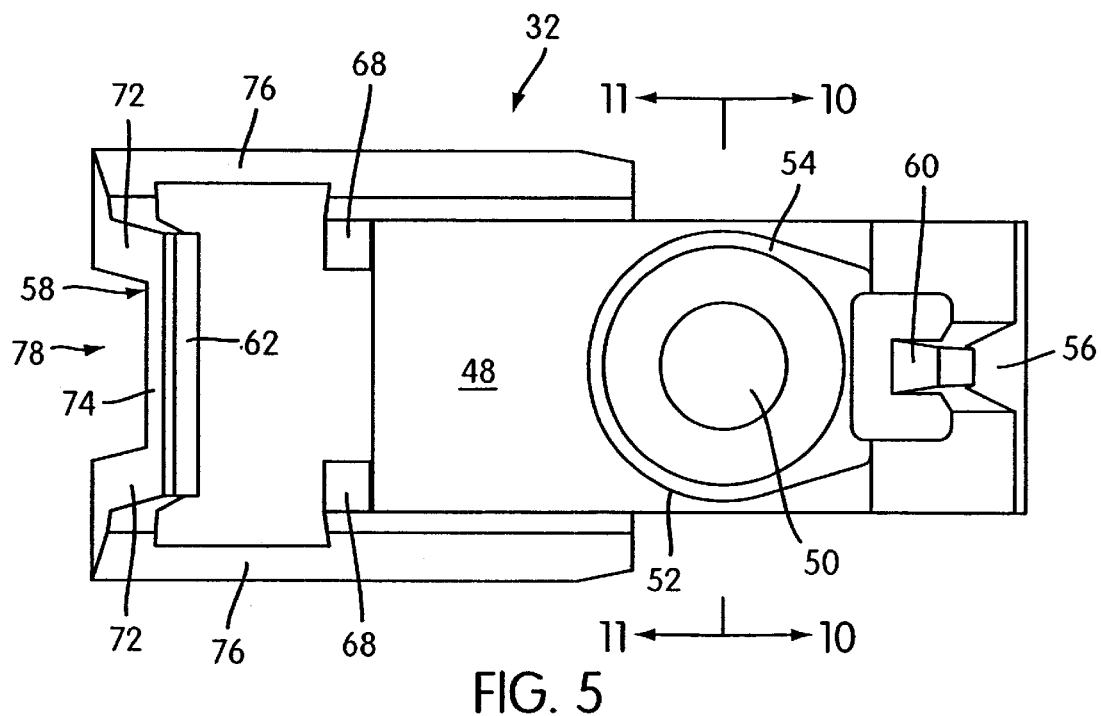
FIG. 5 is a plan view of the snap-on lens carrier of FIG. 3.
Figure 6:
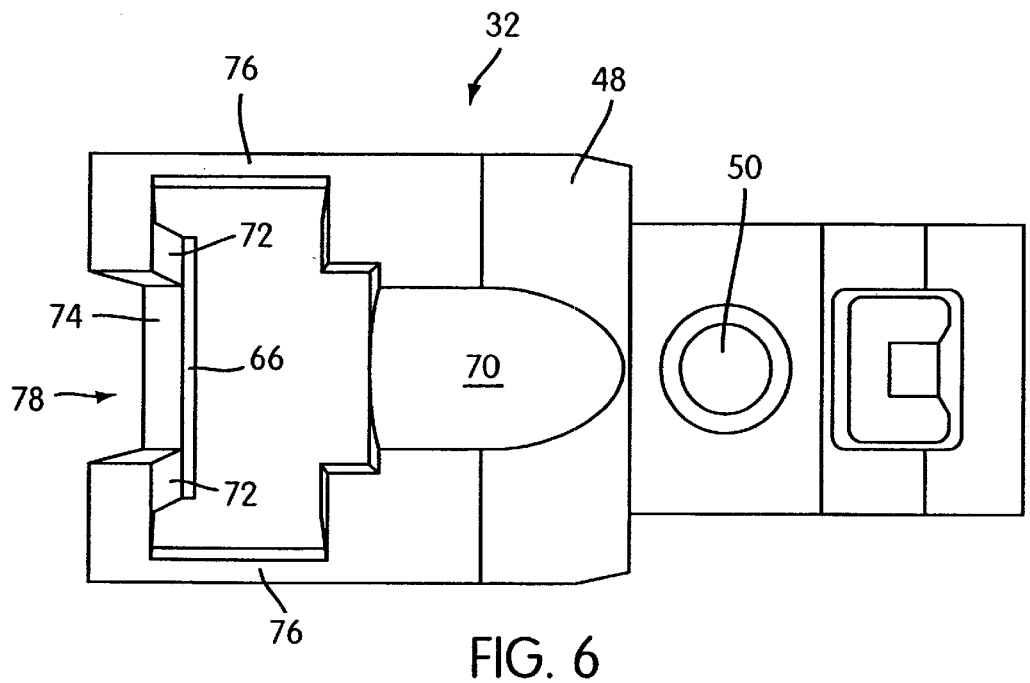
FIG. 6 is a bottom plan view of the snap-lens carrier of FIG. 3.

Body portion 48 of carrier 32 also comprises further bearing surfaces in the manner of two bearing posts 68 which are spaced laterally from annular bearing surface 54. Bearing posts 68 and bearing surface 54 provide bearing surfaces in the same plane which is parallel to the main plane of body 48. As best seen in FIGS. 2A and 4, the distance between these bearing surfaces and the detents 64 and 66 corresponds to the thickness of an optical sensor IC so that one side of the IC bears against surfaces 54 and 68 and detents 64 and 66 bear against the opposite side of the IC. The optical sensor is not shown in FIG. 2A because in that orientation, the sensor is on the underside of IC 34, however, the broken line rectangle on the top of IC 34 corresponds to the location of the sensor on the opposite side. Carrier 32 is precision designed to ensure that lens 50 is aligned with the optical sensor on IC 34 when the carrier is assembled to the IC.

Figure 3:
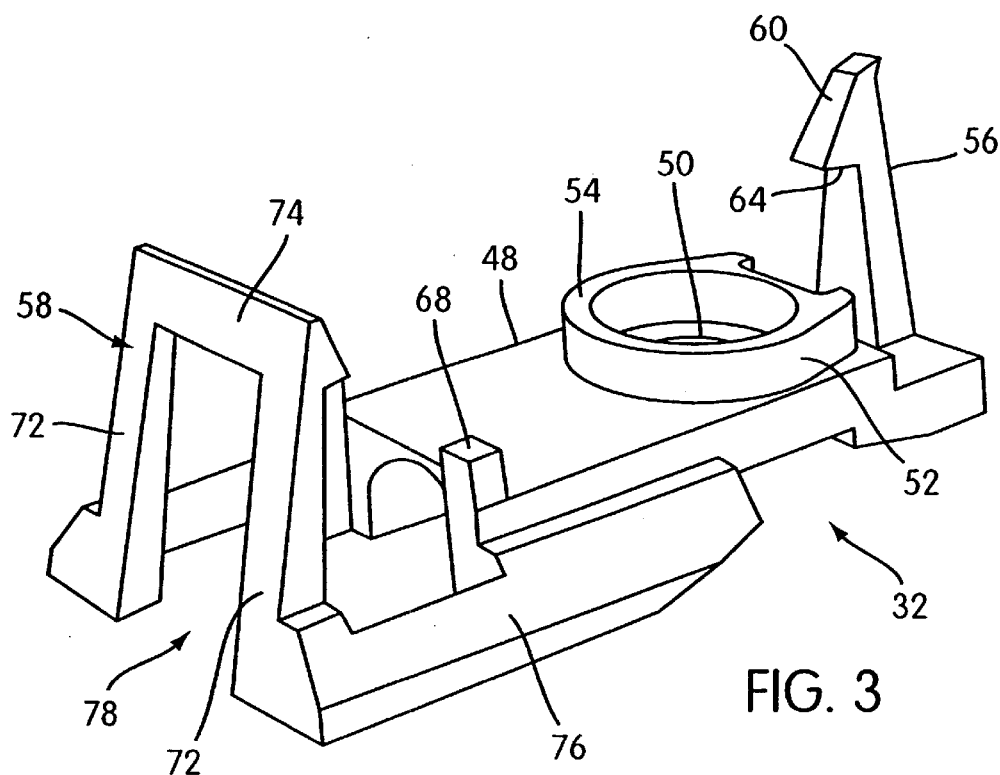
FIG. 3 is a perspective view of the snap-on lens carrier.
Figure 7:
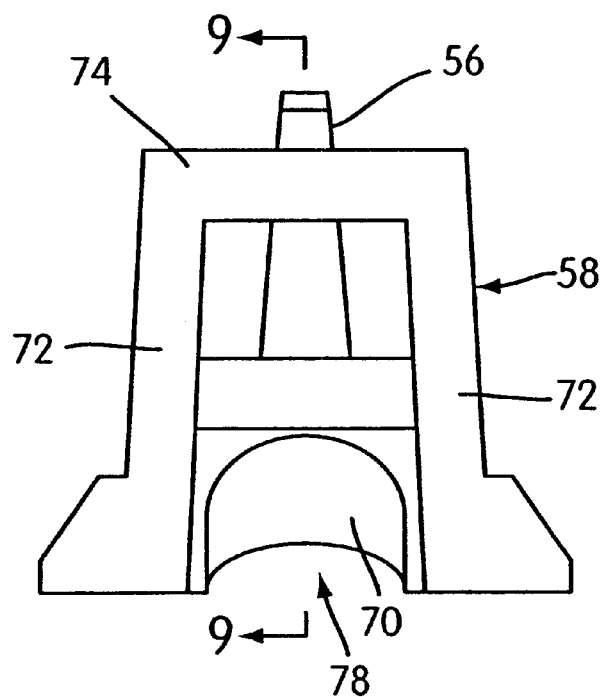
FIG. 7 is an end elevational view of one end the snap-on lens carrier of FIG. 3.
Figure 8:
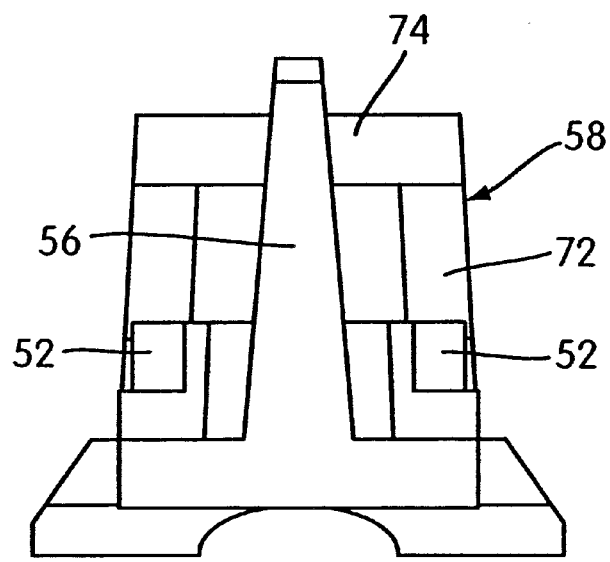
FIG. 8 is an end elevational view of the other end of the snap-on lens carrier of FIG. 3.
Figure 9:
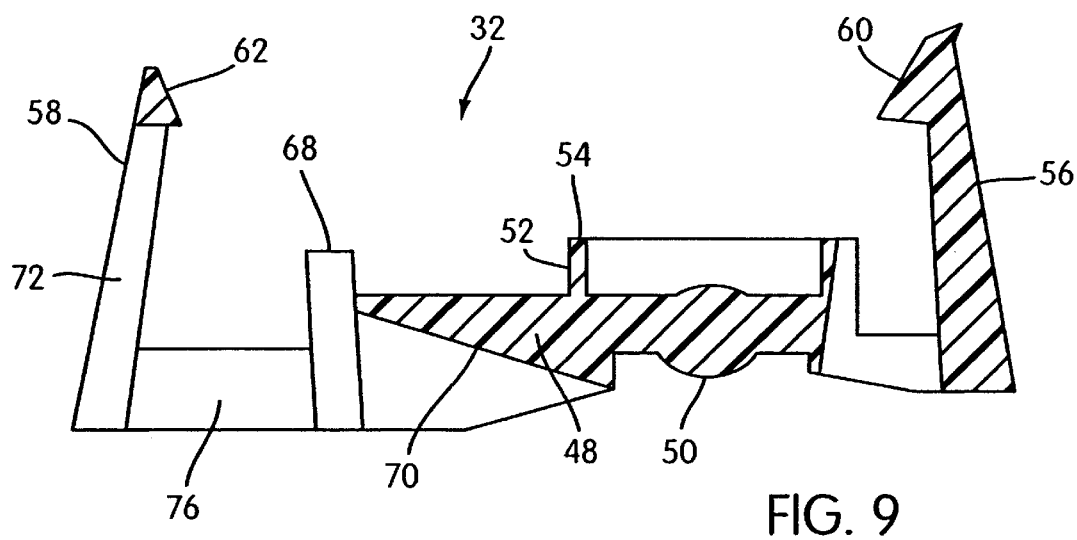
FIG. 9 is cross-sectional view taken along line 9—9 of FIG. 7.
Figure 10:
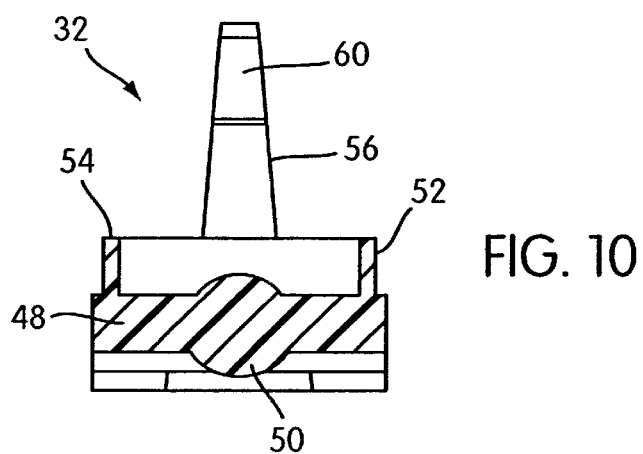
FIG. 10 is a cross-sectional view taken along line 10—10 of FIG. 5.
Figure 11:
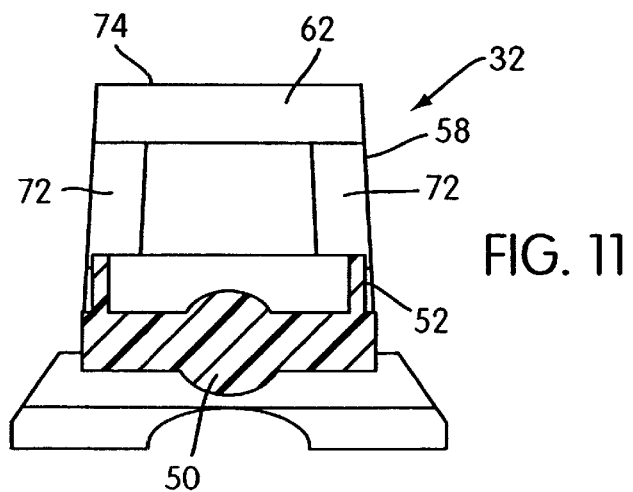
FIG. 11 is a cross-sectional view taken along line 11—11 of FIG. 5.

Another feature of carrier 32 is an LED rest 70 formed on body 48. As seen in FIG. 3, rest 70 is disposed on the underside of carrier 32, and has a smooth curved surface for guiding an LED into a predetermined position relative to lens 50 and the tracking aperture of the base plate. As best seen in FIG. 7 and in the cross-sectional view FIG. 9, rest 70 is angled sufficiently to aim LED into an optimal position relative to lens 50 for the sensor. Carrier 32, and in particular retaining leg 58, are structurally engineered to facilitate positioning of the LED into the assembly. Retaining leg 58 includes two parallel upstanding portions 72 connected by a bridging member 74 which has the integrally formed detent 66 on its inward side. Upstanding portions 72 are extended away from body 48 by a pair of struts 76 which are parallel to the body. Employing struts 76 creates sufficient space to insert an LED through an LED guide opening 78 formed between upstanding portions 72 and bridging member 74 of retaining leg 58. In this manner, carrier 32 structurally supports an LED and ensures proper positioning and registration of the LED as well as the lens and IC.

The preferred order of assembly of the components is best understood with reference to FIG. 2. PCB 36 is provided with an appropriate assembly opening 38 and IC 34 is mounted onto the PCB in the usual manner. Once the IC is mounted, lens carrier 32 is brought from the underside of the IC so that retaining legs 56 and 58 project through assembly opening 38. As carrier 32 and the IC are assembled together, cam surfaces 60 and 62 bear against the end walls of the IC and guide legs 56 and 58 apart from one another. Once the underside of the IC comes to a rest on bearing surfaces 54 and 68, legs 56 and 58 resiliently snap back into their resting position, a little less than 90° from the plane of body 48. At this point detents 64 and 66 engage the top side of the IC as best seen in FIG. 2A to affix the carrier to the IC. It will be apparent to one of skill in the art that by affixing the carrier and IC together in this manner, all potential registration problems between the IC and the lens are eliminated. Since carrier 32 is structurally affixed to the IC itself, any imprecision in the formation of assembly opening 38 in the PCB does not affect the alignment of the lens and sensor. The critical alignment of lens 50 to the IC sensor is achieved in this one assembly step and is not affected by further assembly.

Once the IC mounted PCB and carrier 32 are assembled together, the PCB is assembled to base plate 40 so that the lens and sensor are aligned with tracking aperture 46. While the LED is shown in FIG. 2 adjacent to carrier 32 for ease of understanding, in the assembly of the components, the LED is actually inserted through LED guide opening 78 from the top side of the PCB. As seen in FIG. 2A, once the carrier and IC are assembled, it will be apparent that the LED guide opening will be provided on the top side of the PCB. The LED is inserted through guide opening 78 and bears against LED rest 70 on the underside of carrier 32. Rest 70 has a tapered end surface near lens 50 which facilitates positioning of the LED relative to the lens and tracking aperture 46. Normally tracking aperture 46 is relatively large so that there is clearance around the sensor and lens and LED, and no registration problems are caused by misalignment of the tracking aperture.

Figure 12:
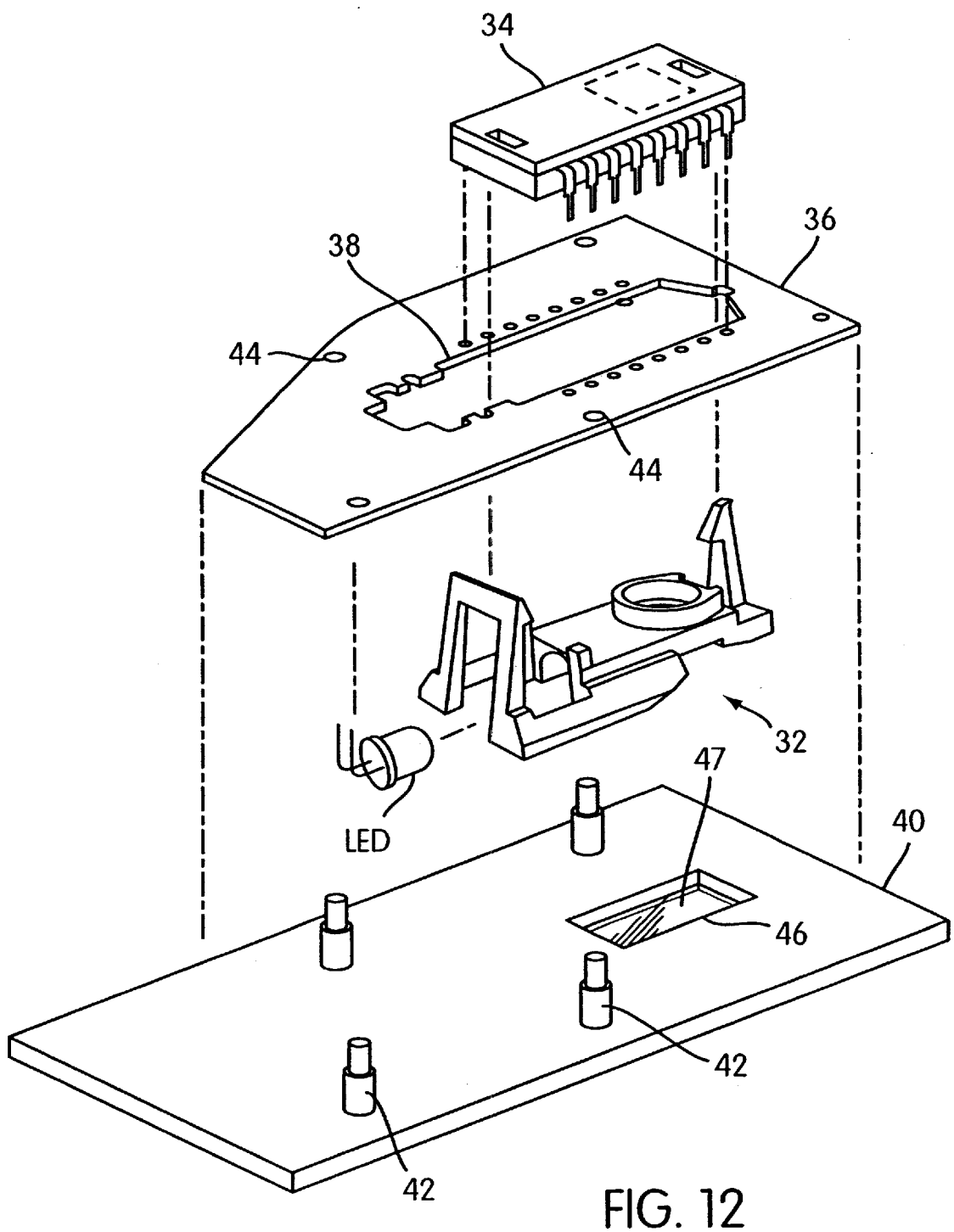
FIG. 12 is an exploded view of the snap-on lens carrier assembly similar to FIG. 2 but shown with a paned tracking aperture.

FIG. 12 is identical to FIG. 2 but illustrates another aspect of the invention, an integral window pane 47 covering tracking aperture 46. Window pane 47 is integrally molded with base plate 40 to keep out contaminants and provide a higher level of electrostatic discharge protection. The thickness of window pane 47 is limited by the minimum thickness that can be injection molded, i.e., the minimum filling thickness in a tool. As is currently contemplated, window pane 47 is approximately 1 mm thick, transparent and flush with the bottom surface of the base plate. It is possible to make pane 47 with some tint or color as long as light can be provided to the tracking surface by the LED.

Figure 13:
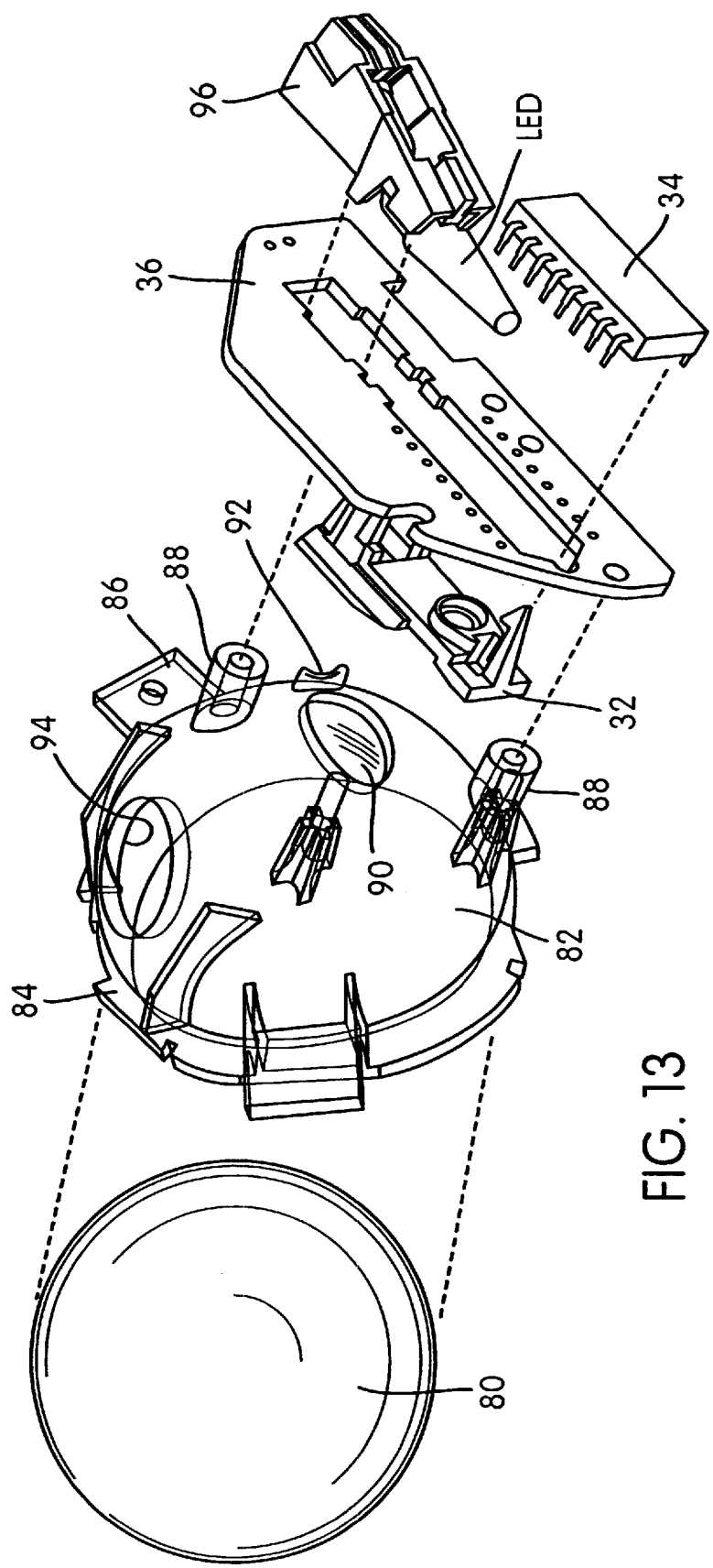
FIG. 13 is an exploded view of the snap-on lens carrier assembly in accordance with the present invention, shown with exemplary components of the optical sensor IC assembly in an optical trackball environment including a ball cup and ball.

FIGS. 13–16 illustrate another aspect of the invention, the use of a ball cup for the component assembly in an optical trackball environment. Components already identified in the preceding description are referred to with the same reference numerals. FIG. 13 is an exploded perspective view of components of an optical trackball device employing snap-on lens carrier 32. When assembled, ball 80 is supported and partially surrounded by a ball cup 82 which is received in a socket of a trackball housing (not shown). Ball cup 82 is transparent and includes various structural elements integrally molded along its circumferential opening and on its convex side. A circumferential lip 84 extends around the circumference of the opening and includes any number of assembly tabs 86. A number of alignment guides 88 are provided for aligning and assembling PCB 36 to the ball cup. PCB 36 has mounted on it an optical sensor equipped IC 34 assembled to snap-on lens carrier 32. The snap-on lens carrier, IC 34 and PCB 36 are assembled for the trackball environment identically to their assembly for an optical mouse environment described herein.

Figure 15:
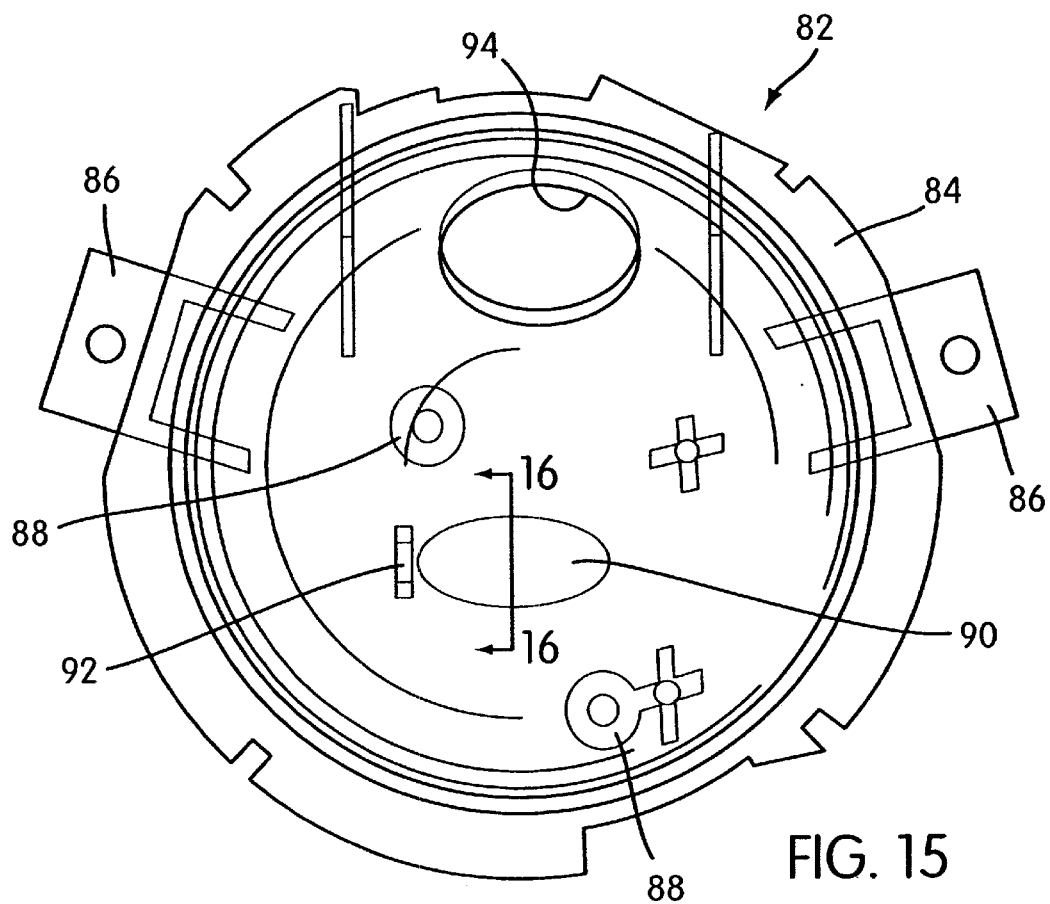
FIG. 15 is a plan view of the ball cup viewed from the concave side.
Figure 16:
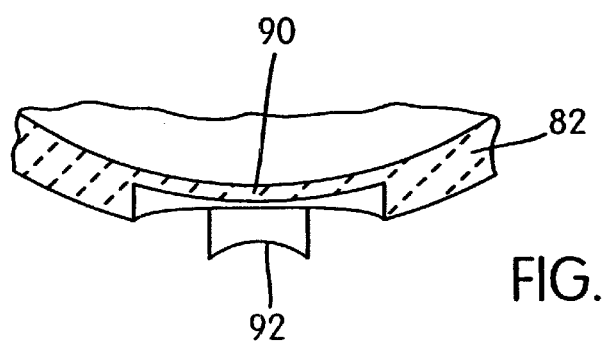
FIG. 16 is a cross-sectional view of the ball cup taken along line 16—16 in FIG. 15.

Located proximate alignment guides 88 on ball cup 82 is an integrally molded tracking window 90. Tracking window 90, similar to tracking window 47 described above, is of the minimum thickness allowed by an injection molding process which is currently contemplated to be approximately 1 mm. Tracking window 90, instead of a through-hole or a hole which is covered by a separate element, ensures that dust and other contaminants are kept out of the trackball housing. The integral tracking window also eliminates the possibility of adhesive failure or shifting of separate coverings. Integral tracking window 90 also provides an added measure of electrostatic discharge protection to the device. FIG. 15, viewing the ball cup from its concave side, i.e. into the hollow of the cup, illustrates the positions of the structural components molded to the convex side of the cup such as alignment guides 88 and LED support 92 relative to tracking window 90. Closer to the lip of the ball cup, a larger through-hole 94 is provided to allow for easier removal of the ball. Through-hole 94 does not have an optical function. FIG. 16 describes pictorially integrally molded tracking window 90 along the surface of ball cup 82.

Figure 14:
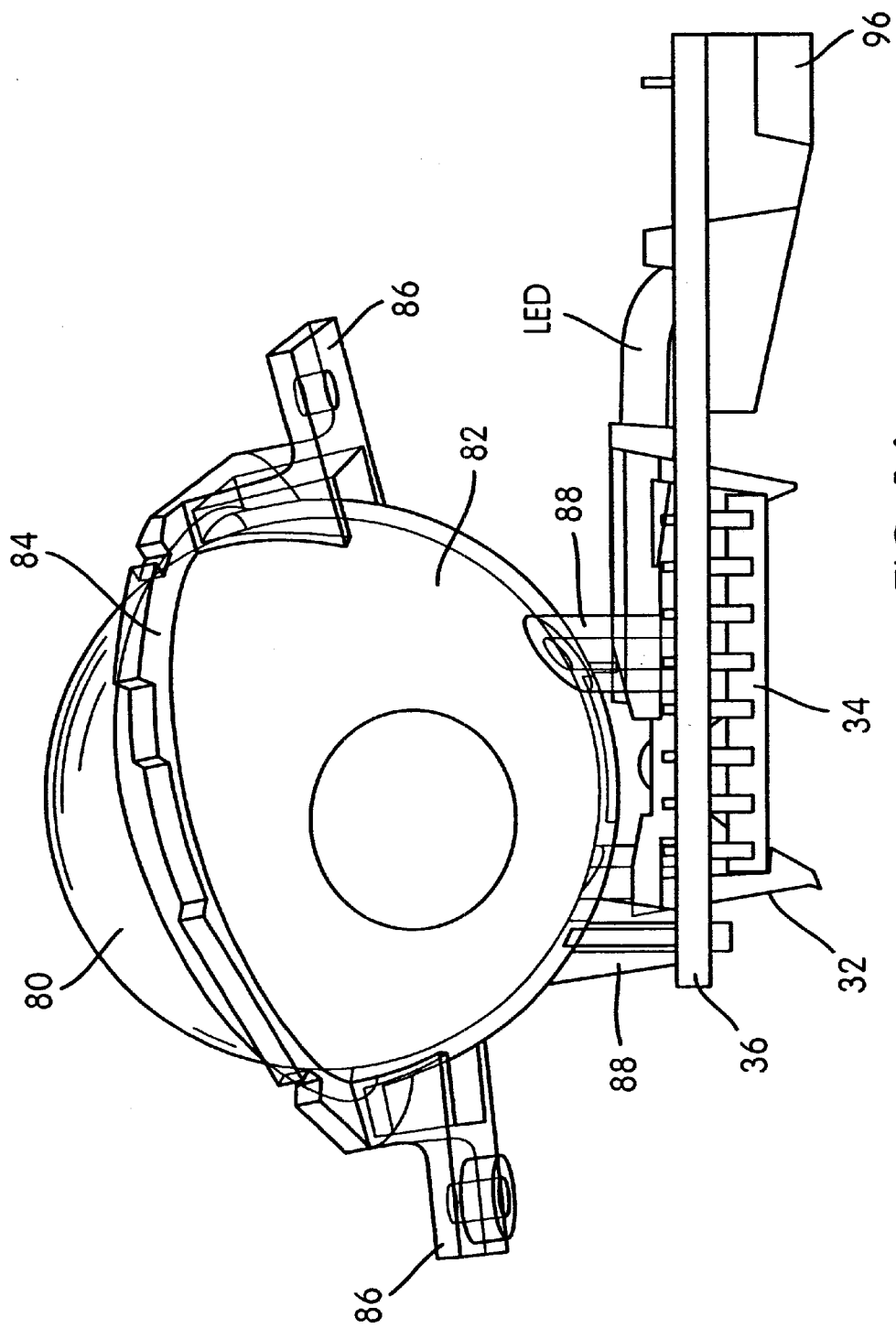
FIG. 14 is an elevational view of the ball cup assembly and snap-on lens carrier of FIG. 13, shown assembled together.

Proximate window 90 is an LED support 92 which, in conjunction with LED rest 70 (not shown in FIG. 13) on the underside of lens carrier 32, guides the LED into the correct position to illuminate the tracking surface on the ball. An LED retainer 96 is shown with LED in FIG. 13, and similar to the optical mouse environment, the LED is inserted through LED guide opening 78 and bears against LED rest 70 as seen in FIG. 14. The tapered end surface of the lens carrier LED rest 70 facilitates positioning of the LED relative to the lens and tracking window 90 with the help of LED support 92 which has a U-shaped notch to receive a rounded surface of an LED or LED housing.

The LED illuminates the tracking surface of the ball, and in the trackball environment, the optimization of the optics takes more factors into account than in an mouse environment in which the tracking surface and tracking window are flat. First, tracking window 90 introduces a parallel plate to the IC and lens which shifts the focal length and bends the light from the LED. In addition, a clear overcoat on the ball surface also bends the light before it hits the target tracking surface. The size of the tracking window and positioning of the LED are determined with sufficient tolerances to ensure that the reading zone of the optical sensor and lens falls within an area that is illuminated by the LED. In one embodiment, the LED illuminates a 5 mm by 5 mm area of the ball, and the reading zone of the optical sensor and lens a 2 mm by 2 mm area that occurs within the illumination zone.

Another consideration in the trackball environment is to ensure that to the sensor, the tracking window is completely transparent. The currently contemplated way to achieve this is to tint the ball cup with a color having the same wavelength as the LED so that the tracking window does not interfere or hinder what the sensor is able to "read" on the tracking surface. In a particular embodiment, the ball cup is tinted a shade of red which corresponds in wavelength to the LED employed in the device.

Although the lens carrier has been illustrated with retaining legs in opposing relationship, a single retaining leg or multiple retaining legs in different configurations are also contemplated to be within the scope of the invention. Alternatively, other retaining structures which enable snap-on engagement of the lens carrier to the IC are also contemplated to be within the purview of the present invention.

Snap-on lens carrier 32 eliminates multiple registration problems of the prior art by affixing the structural relationship between the IC sensor and lens 50. The dimensions of the IC and position of the sensor being known, precision engineering of the carrier enables automatic, repeatable alignment of the sensor and lens. Employing the carrier makes production more efficient and enhances reliability of the devices.

In an optical trackball environment a ball cup having an integrally molded tracking window is employed with the snap-on lens carrier. The optical sensor and PCB on which it is mounted are assembled to the ball cup so that the lens is automatically aligned with the tracking window and arranged in an optimal position for the sensor to "read" the tracking surface of the ball. The ball cup with integral tracking window can, however, be used with other types of optical sensor lenses, and provides a barrier for contaminants and extra electrostatic discharge protection.

Thus has been described a snap-on lens carrier for an optical sensor equipped IC for automatic and precise registration of the lens and sensor which is not affected by other assembly steps. In an optical trackball device, the same snap-on lens carrier has been described for use in conjunction with a ball cup having an integrally molded tracking window. The foregoing explanation includes many variations and embodiments, and the invention is not intended to be limited to the specific details disclosed herein, but only by the claims appended hereto.

What is claimed is:

1. A lens carrier for use with an optical sensor equipped integrated chip, said carrier comprising:
    a body portion having a bearing surface for supporting an integrated chip and a lens adapted to be aligned with the sensor of the chip; and
    a retaining leg integral with said body and extending generally perpendicular to said bearing surface of said body, said leg having a detent at its free end for securing the integrated chip when assembled thereto.

2. The lens carrier of claim 1 further comprising a second retaining leg extending generally perpendicular to said body and having a detent at its free end for securing the integrated chip when assembled thereto.

3. The lens carrier of claim 2 wherein said retaining legs are disposed in opposing relation to one another.

4. The lens carrier of claim 3 wherein said retaining legs are angled toward each other, each angled less than 90° from said body.

5. The lens carrier of claim 4 further comprising sloped cam surfaces on the free ends of said retaining legs.

6. The lens carrier of claim 1, wherein said retaining leg comprises a pair of spaced apart members connected together by a bridging member, said detent formed along at least a portion of said bridging member.

7. The lens carrier of claim 6 further comprising a curved rest integrally formed on said body in opposing relation to said bearing surface.

8. The lens carrier of claim 7 wherein said rest is angled toward said lens.

9. The lens carrier of claim 6 further comprising a second retaining leg extending generally perpendicular to said body and having a detent at its free end for securing the integrated chip when assembled thereto.

10. The lens carrier of claim 9 wherein said retaining legs are disposed in opposing relation to one another.

11. The lens carrier of claim 10 wherein said retaining legs are angled toward each other, each angled less than 90° from said body.

12. The lens carrier of claim 11 further comprising sloped cam surfaces on the free ends of said retaining legs.

13. A combination lens carrier and optical sensor equipped integrated chip, the combination comprising:
    an integrated chip of predetermined thickness having an optical sensor disposed on a first side; and
    a lens carrier having comprising a body portion having a bearing surface for supporting said integrated chip thereon and a lens disposed to be aligned with said optical sensor, and a retaining leg integral with said body and extending generally perpendicular to said bearing surface of said body, said leg having a detent at its free end for engaging said integrated chip on a second side and thereby securing said integrated chip to said lens carrier, said detent spaced from said bearing surface a distance corresponding to the thickness of said integrated chip.

14. The combination of claim 13 wherein said lens carrier further comprises a second retaining leg extending generally perpendicular to said body and having a detent at its free end for engaging said integrated chip.

15. The combination of claim 14 wherein said retaining legs of said lens carrier are disposed in opposing relation to one another to engage the ends of said integrated chip.

16. The combination of claim 15 wherein said retaining legs of said lens carrier are angled toward each other, each angled less than 90° from said body to enable snap-on engagement of said integrated chip thereto.

17. The combination of said claim 16 further comprising sloped cam surfaces on the free ends of said retaining legs for facilitating snap-on engagement of said integrated chip thereto.

18. The combination of claim 13, wherein said retaining leg comprises a pair of spaced apart members connected together by a bridging member, said detent formed along at least a portion of said bridging member.

19. The combination of claim 18 further comprising a curved rest integrally formed on said body in opposing relation to said bearing surface.

20. The combination of claim 19 wherein said rest is angled toward said lens.

21. The combination of claim 18 further comprising a second retaining leg extending generally perpendicular to said body and having a detent at its free end for securing said integrated chip.

22. The combination of claim 21 wherein said retaining legs are disposed in opposing relation to one another.

23. The combination of claim 22 wherein said retaining legs are angled toward each other, each angled less than 90° from said body.

24. The combination of claim 23 further comprising sloped cam surfaces on the free ends of said retaining legs.

25. A method of assembling an optical sensor equipped integrated chip in the housing of a pointing device, said method comprising the steps of:
    providing an assembly opening in a printed circuit board;
    mounting an optical sensor equipped integrated chip on one side of the printed circuit board along the assembly opening so as to aim the sensor through the assembly opening and toward the opposite side of the printed circuit board;
    rigidly affixing a lens to the integrated chip in aligned relation to the sensor, said affixing step comprising providing a lens carrier with resiliently biased retaining legs provided with detents to the integrated chip from said opposite side of the printed circuit board, and securing the lens carrier to the integrated chip by moving said retaining legs away from one another and allowing legs to return to their resting position with the detents locked onto the integrated chip; and aligning the lens and sensor on the printed circuit board with a tracking aperture in a housing base plate and securing the printed circuit board thereon.

26. A subassembly for an optical trackball pointing device, said subassembly comprising:

a ball with a tracking surface adapted to be manipulated by a user;

a ball cup adapted to be mounted in a trackball housing socket for supporting and surrounding a portion of the ball, said ball cup having a concave side for receiving the ball, a convex side disposed within the socket and an integrally molded, transparent tracking window;

a light source aimed through said tracking window to illuminate the tracking surface;

an integrated chip equipped with an optical sensor and aligned lens disposed in operative alignment with said tracking window so the tracking surface is visible to said sensor.

27. The subassembly of claim 26, wherein said ball cup comprises an integral support for said light source on the convex side.

28. The subassembly of claim 27, wherein said ball cup comprises alignment guides for assembling a PCB thereon.

29. The subassembly of claim 26, wherein said tracking window has a thickness of less than 6 mm.

30. The subassembly of claim 26, wherein said lens is integral with a snap-on lens carrier comprising a body portion having a bearing surface for supporting the integrated chip such that the sensor is aligned with the lens, and a retaining leg integral with said body and extending generally perpendicular to said bearing surface, said leg having a detent at its free end for securing the integrated chip when assembled thereto.

31. The subassembly of claim 30, wherein said lens carrier further comprises a second retaining leg extending generally perpendicular to said body and having a detent at its free end for securing the integrated chip when assembled thereto.

32. The subassembly of claim 31, wherein said retaining legs are disposed in opposing relation to one another.

33. The subassembly of 32, wherein said retaining legs are angled toward each other, each angled less than 90° from said body.

34. The subassembly of claim 33, wherein said lens carrier further comprises sloped cam surfaces on the free ends of said retaining legs.

35. The subassembly of claim 30, wherein said retaining leg comprises a pair of spaced apart members connected together by a bridging member, said detent formed along at least a portion of said bridging member.

36. The subassembly of claim 35, wherein said lens carrier further comprises a curved rest integrally formed on said body in opposing relation to said bearing surface.

37. The subassembly of claim 36, wherein said rest is sloped toward said lens.

38. A ball cup for an optical trackball pointing device, said ball cup adapted to be mounted in a trackball housing socket for supporting and surrounding a portion of a ball having a tracking surface, said ball cup comprising:

a concave side for receiving the ball;

a convex side adapted to be disposed within the socket; and an integrally molded transparent tracking window.

39. The ball cup of claim 38, wherein said ball cup comprises an integrally molded light support for a light source on the convex side.

40. The ball cup of claim 39, wherein said light support protrudes outwardly from the convex side of said ball cup and has a notch for receiving a light source housing.

41. The ball cup of claim 38, wherein said ball cup comprises an alignment guide integrally molded to the convex side for assembling a PCB thereon.

42. The ball cup of claim 38, wherein said tracking window has a thickness of less than 6 mm.

43. A method of preventing particulate contamination to an optical sensor of an optical pointing device comprising:

integrally molding a transparent tracking window to a portion of a device housing;

arranging an optical sensor inside the device housing in alignment with the tracking window so as to isolate the sensor from the exterior of the device housing.

44. The method of claim 43, wherein said molding step comprises injection molding a base plate of an optical pointing device with a transparent tracking window integrally formed with the base plate.

45. The method of claim 43, wherein said molding step comprises injection molding a ball cup for an optical pointing device with a transparent tracking window integrally formed with the ball cup.

* * * * *